United States Patent [19]

Pratt et al.

[11] Patent Number: 5,354,160
[45] Date of Patent: Oct. 11, 1994

[54] COMPOSITE FASTENER

[75] Inventors: John D. Pratt, Laguna Niguel; Clyde D. Simmons, Riverside, both of Calif.

[73] Assignee: Textron Inc., Providence, R.I.

[21] Appl. No.: 927,075

[22] Filed: Aug. 7, 1992

Related U.S. Application Data

[63] Continuation-in-part of Ser. No. 742,636, Aug. 8, 1991, abandoned, and a continuation-in-part of Ser. No. 682,880, Apr. 8, 1991, Pat. No. 5,153,978, which is a continuation of Ser. No. 475,155, Feb. 5, 1990, abandoned.

[51] Int. Cl.$^5$ .............................................. F16B 19/08
[52] U.S. Cl. .................. 411/501; 29/243.521; 29/243.526; 29/509; 411/361
[58] Field of Search ............ 29/243.521, 243.522, 29/243.526, 243.53, 509, 524.1, 525.2; 411/43, 171, 501, 504, 505, 506, 908, 361

[56] References Cited

U.S. PATENT DOCUMENTS

| | | |
|---|---|---|
| 1,410,812 | 3/1922 | Joberty . |
| 2,510,693 | 6/1950 | Green . |
| 3,025,730 | 3/1962 | Brilmyer et al. . |
| 3,095,776 | 7/1963 | Brilymer et al. . |
| 3,122,050 | 2/1964 | Wenson . |
| 3,385,741 | 5/1968 | Allen . |
| 3,421,562 | 1/1969 | Orloff et al. . |
| 3,481,803 | 12/1969 | Hewitt . |
| 3,547,741 | 12/1970 | Hewitt . |
| 3,576,067 | 4/1971 | Loyd . |
| 3,690,088 | 9/1972 | Anderson et al. . |
| 3,772,957 | 11/1973 | Newton . |
| 3,893,496 | 7/1975 | Wallace et al. . |
| 4,012,984 | 3/1977 | Matuschek . |
| 4,051,592 | 10/1977 | Briles . |
| 4,208,943 | 6/1980 | Smith . |
| 4,247,346 | 1/1981 | Maehara et al. . |
| 4,399,166 | 8/1983 | Wallace . |
| 4,428,981 | 1/1984 | Wallace . |
| 4,477,307 | 10/1984 | Cearlock et al. . |
| 4,478,543 | 10/1984 | Lyon . |
| 4,478,544 | 10/1984 | Strand . |
| 4,508,759 | 4/1985 | Wallace . |
| 4,551,189 | 11/1985 | Peterson . |
| 4,633,559 | 1/1987 | Loren . |
| 4,636,124 | 1/1987 | Gugle et al. . |
| 4,649,727 | 3/1987 | Gray . |
| 4,659,268 | 4/1987 | Del Mundo et al. . |

(List continued on next page.)

FOREIGN PATENT DOCUMENTS

| | | |
|---|---|---|
| 39847 | 9/1973 | Australia . |
| 0268957 | 6/1988 | European Pat. Off. . |
| 0279014 | 8/1988 | European Pat. Off. . |
| 2248471 | 4/1974 | Fed. Rep. of Germany . |
| 2641804 | 3/1978 | Fed. Rep. of Germany . |
| 3109500 | 10/1982 | Fed. Rep. of Germany . |
| 3543105 | 6/1987 | Fed. Rep. of Germany . |
| 8606447 | 11/1986 | PCT Int'l Appl. . |
| 9111309 | 8/1991 | PCT Int'l Appl. . |
| 880594 | 11/1941 | U.S.S.R. . |
| 555151 | 8/1943 | United Kingdom . |
| 207866 | 1/1982 | United Kingdom . |
| 2096724 | 10/1982 | United Kingdom . |
| 2173139 | 10/1986 | United Kingdom . |
| 2205374 | 12/1988 | United Kingdom . |

*Primary Examiner*—Mark Rosenbaum
*Assistant Examiner*—David P. Bryant
*Attorney, Agent, or Firm*—Knobbe, Martens, Olson & Bear

[57] ABSTRACT

Composite fasteners joining panels together are installed by a tool that grips the end of a fastener stem and exerts a pulling force which causes a rotating forming die to advance toward the fastener. The rotating die is pressed against the fastener to frictionally heat and deform a tail of the fastener to create an upset head. A sensing device stops the movement of the forming die and controls the size of the upset head. A portion of the stem extending from the fastener is then pulled away by a pulling force on the stem. Preferred dimensional relationships of said upset head are disclosed, together with various fastener constructions.

6 Claims, 7 Drawing Sheets

U.S. PATENT DOCUMENTS

| | | |
|---|---|---|
| 4,676,707 | 6/1987 | Cearlock et al. . |
| 4,682,520 | 7/1987 | Gray . |
| 4,687,394 | 8/1987 | Berecz . |
| 4,687,395 | 8/1987 | Berecz et al. . |
| 4,687,396 | 8/1987 | Berecz . |
| 4,687,397 | 8/1987 | Berecz . |
| 4,687,398 | 8/1987 | Berecz . |
| 4,752,171 | 6/1988 | Pliml, Jr. . |
| 4,784,709 | 11/1988 | Unger et al. . |
| 4,787,956 | 11/1988 | Hoefer et al. . |
| 4,806,054 | 2/1989 | Rath . |
| 4,822,671 | 4/1989 | Carper et al. . |
| 4,861,211 | 8/1989 | Dunsmore . |
| 4,877,362 | 10/1989 | Berecz et al. . |
| 4,927,307 | 5/1990 | Fitzgerald et al. . |
| 4,943,196 | 7/1990 | Dahl . |
| 4,975,006 | 12/1990 | Swanson . |
| 4,983,085 | 1/1991 | Gray . |

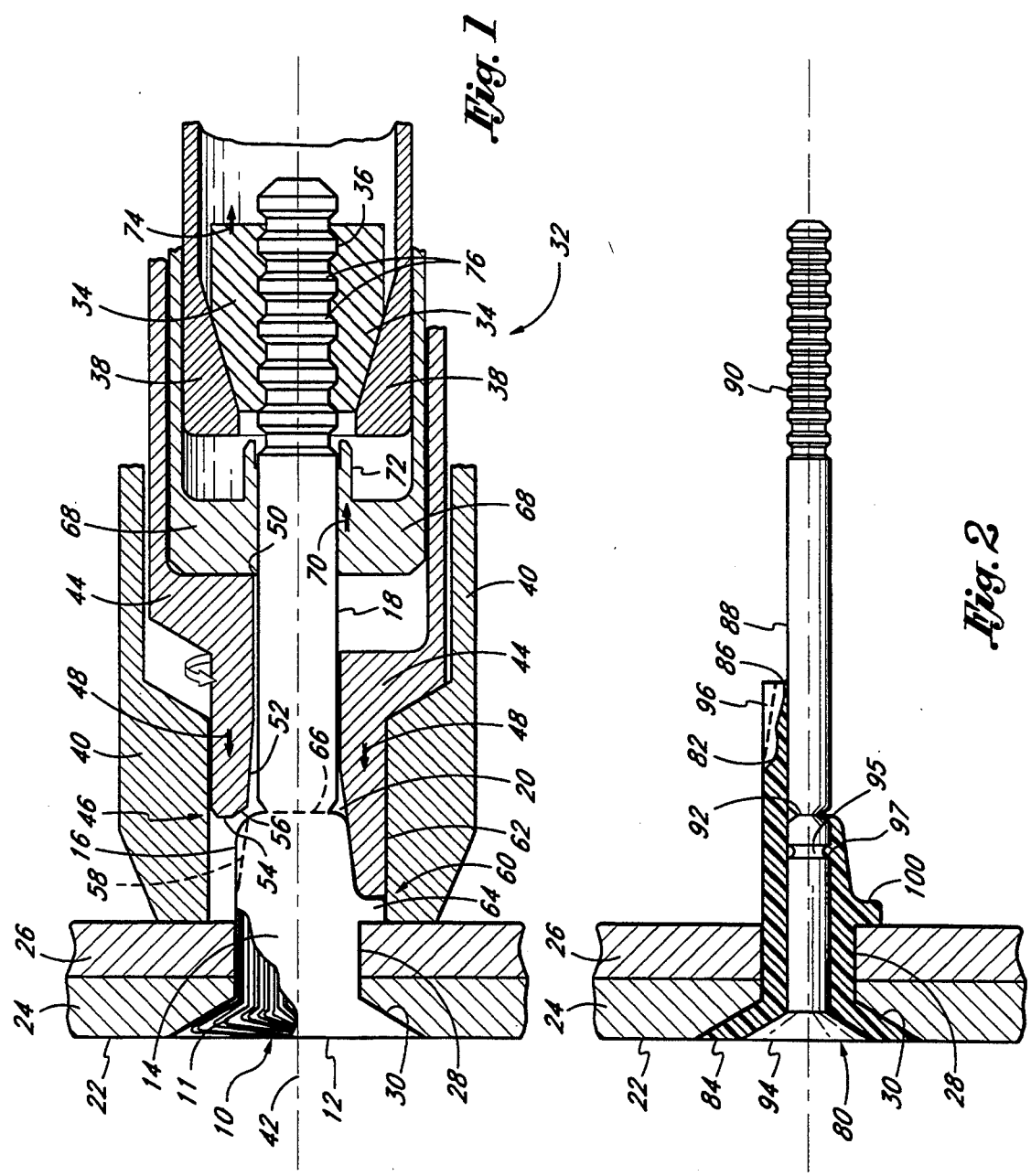

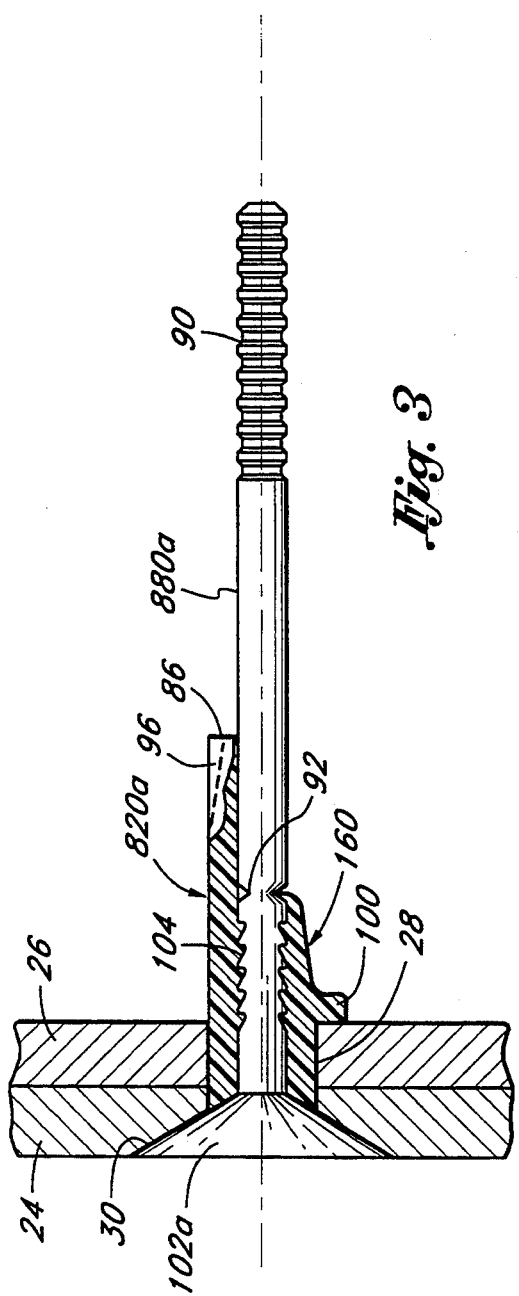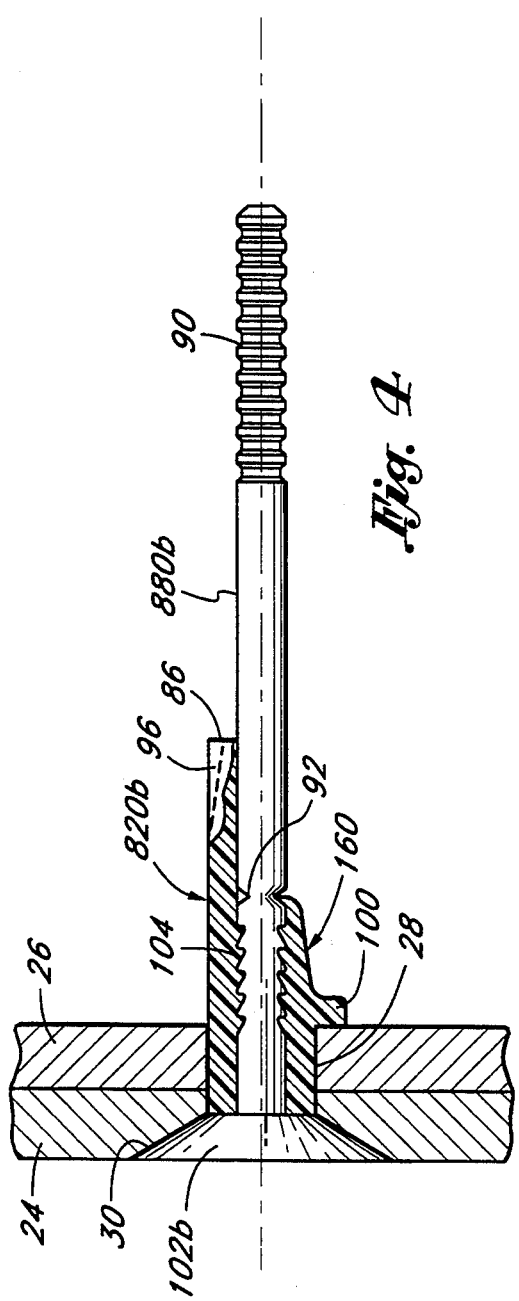

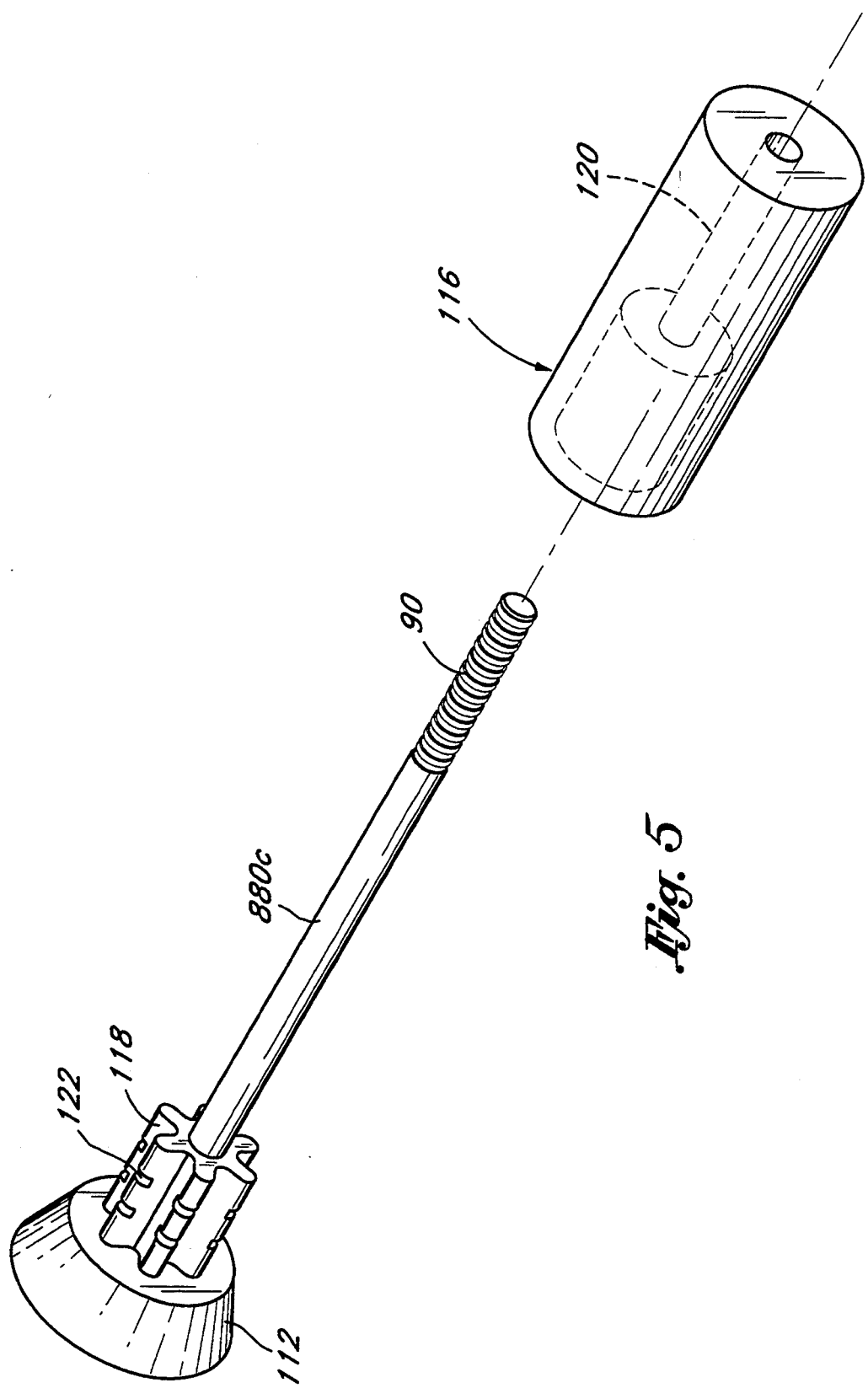

5,354,160

COMPOSITE FASTENER

RELATED APPLICATIONS

This is a continuation-in-part of U.S. patent application Ser. No. 742,636, filed Aug. 8, 1991, now abandoned, and of application Ser. No. 682,880, filed Apr. 8, 1991, now U.S. Pat. No. 5,153,978, which is a continuation of application Ser. No. 475,155 filed Feb. 5, 1990, now abandoned.

BACKGROUND OF THE INVENTION

The present invention relates to the field of mechanically joining composite panels such as in aerospace vehicles, and more particularly, to the use of composite fasteners in which a portion of the fastener is reformed into an upset head for retaining the mechanical connection.

The use of composite materials in the construction of military and commercial aerospace vehicles is widespread and increasing. The most commonly used composites consist of a polymer matrix reinforced with fibers of such materials as carbon and glass.

In many cases relatively thin composite panels are used. To fasten such panels together, adhesive bonding is used wherever possible. When adhesive bonding alone is judged insufficient, fasteners are used in addition to, or in place of, adhesives.

In the manufacture of conventional aluminum aircraft, solid aluminum rivets have been used successfully in very large quantities to fasten thin panels, starting in about 1935 and continuing to the present time. Aluminum rivets are not always suitable, however, for use in composite sheet material for several reasons. Some composite materials cause accelerated corrosion of aluminum rivets. The coefficients of expansion of aluminum and the composite materials may be too widely different. For these reasons a need exists for a rivet which is itself made from composite material.

Considerable work is now being done to enable rivets made from composite material to be used to fasten composite sheets, with or without prior adhesive bonding. Until recently, these composite solid rivets have been fabricated using the injection molding process to form a rivet having the required manufactured head shape at one end of the usual cylindrical shank portion. The shank portion was made sufficiently long to pass through the workpieces to be fastened and then protrude approximately two shank diameters beyond. Later, this two diameter protruding length is upset to form a "shop formed" head, which in conjunction with the manufactured head, serves to hold the workpieces together.

Examples of suitable materials for making composite solid rivets by injection molding are PEI (polyetherimide), reinforced with short glass fibers, and PEEK (polyetheretherketone), reinforced with short carbon fibers. Both these materials belong to a composite materials category which is commonly known as "thermoplastic." Such materials become soft and formable at temperatures in the 600°-700° range, but when cooled to room temperature, exhibit useful structural strength. These materials, therefore, are ideal for "shop formation."

Rivets made from these short fiber reinforced thermoplastic materials have typical average shear strengths of about 16 KSI when measured using the method of MIL-STD-1312 Test 20, and have typical average tension strength in the range of 14 to 16 KSI. These rivets may be upset with any simple tooling capable of providing a heat input to the protruding rivet tail, followed by pressure to upset the tail when it becomes soft and formable.

This riveting process has gained favor for fastening composite materials because the rivets are easily made on high production injection molding machines they are also inexpensive compared to other suitable fasteners for composites such as titanium threaded shear pins and collars. Also, the drilling of holes in a workpiece and the insertion and upsetting of these rivets can be easily automated. In this way, fastening may be accomplished with a simple inexpensive fastener using an inexpensive and reliable installation method.

In some thick or high bearing strength workpieces, the 16 KSI shear strength and the 12 to 14 KSI tension strength of common short fiber reinforced thermoplastic materials is not adequate. Thus, the need exists for a rivet made from composite material and having higher shear and tension strengths.

Long fiber reinforced, threaded shear-pin type fasteners, having 40 to 60 KSI average ultimate shear strength, have been developed by the Cherry Division of Textron, Inc. However, it is difficult to upset rivets made in this way in a workpiece.

Joining of panels using long fiber reformable composite rivets has been described earlier in U.S. patent application Ser. No. 475,155, now abandoned in favor of continuation application Ser. No. 682,880 filed Apr. 8, 1991, wherein the tail of a solid composite rivet protruding through the panels or workpiece is reformed into a head pressing against the panels. The deforming takes place through heating of the rivet tail and ultimately causing it to deform from pressure applied to the softened composite. Heating in this instance is achieved by the friction of a rotating shaping anvil pressing against the rivet tail.

Because the heat generated by the friction of the rotating anvil begins to dissipate when rotation is terminated, the softened rivet head cools and then hardens.

In the past, this method has been better suited for use with a stationary machine rather than a hand-held tool. The stationary unit allows proper alignment of all parts and prevents abuse to the panels through a controlled process comprising, controlling the speed of the rotating anvil, the pressure on the workpiece, and the rate of displacement of the rivet tail.

There are, however, installation situations where such a stationary anvil can not be employed. Thus, it is desirable to be able to use the rotating tool technique with a hand-held tool.

Hand tools have, of course, been used for many years for deforming fastener components without the use of heat. One well-known method of installing blind rivets is to pull a rivet stem partially through a tubular fastener to enlarge the blind end of the fastener and lock it in place. Typically, the use of a break groove or break notch allows separation of a portion of the stem by pulling the stem until the tensile strength of the reduced diameter is exceeded and it fractures at the groove or notch. Also, hand tools are used for deforming nuts onto lock pins having pull stems and break grooves.

SUMMARY OF THE INVENTION

The invention comprises a thermoplastic fastener, preferably fiber reinforced, having a preformed or manufactured head on one end, a shank and a reduced diameter pulling stem on the other end. The invention further comprises the method of "setting" the fastener. Panels having common coaxial bores form a workpiece and are joined by inserting the fastener through the workpiece, and frictionally heating the tail of the shank with a rotating die, while pulling on the stem. This forms an upset head against the workpiece. Following formation and solidifying of the upset head, the pulling force on the stem is increased until the tensile strength of a break notch is exceeded, and the stem breaks away leaving a composite fastener mechanically joining the workpieces.

The invention also comprises a hand tool, utilized to frictionally heat and deform the tail of the rivet shank, to form the upset head. This tool advantageously utilizes a spinning and pressing force to heat and deform the rivet tail, while a pulling force in the opposite direction is generated and utilized to balance and equalize pressure exerted on the workpiece. The tool has a rotating forming die which, by contacting the shank tail and heating the thermoplastic material by friction, forms the shape of the upset head. The tool is driven pneumatically and generates pressure against the tail end of the rivet by simultaneously exerting a pulling force on the stem of the rivet. The tool is also advantageously self-centering, in contrast to other automated systems.

A preferred form of the tool includes a spring loaded, axially movable shroud that surrounds the rotating die. A predetermined annular clearance or gap is formed between the periphery of the die and the interior of the shroud. This enables excess softened material, or "flash," of the tail to be extruded through this clearance space or flash gap. Such an arrangement is desirable in that it enables a given fastener to be employed with workpieces with varying thicknesses while yet providing substantially uniform upset heads. Likewise, the flash gap accommodates variations in fastener length. In use, compression on the hardening upset head controlled by the flash gap, produces a desired residual compression on the workpiece.

In one form, the composite fastener is fabricated from a single piece of reinforced thermoplastic material. An alternate embodiment of the fastener includes a tubular reinforced thermoplastic rivet with a smaller diameter metal stem concentrically located within the tubular rivet. The head can either be formed of metal engaging the workpiece or a combination of metal engaging a head on the composite material, which in turn engages the workpiece. The rivet stem and the rivet may have interengaging portions to facilitate stem retention.

BRIEF DESCRIPTION OF THE DRAWINGS

FIG. 1 is a sectional view, one-half of which shows the fastener of the invention in place with the respective front portion of the tool, and the other half of which shows the second head being formed by the tool.

FIG. 2 is a sectional view of an alternate fastener configuration, the upper half showing the fastener before setting, and the lower half showing the fastener after setting.

FIG. 3 is a sectional view of an alternate embodiment of the fastener, the upper half showing the fastener before setting, and the lower half showing the fastener after setting.

FIG. 4 is a sectional view of an alternate embodiment of the fastener, the upper half showing the fastener before setting, and the lower half showing the fastener after setting.

FIG. 5 is a perspective view of an alternate embodiment of the fastener.

DETAILED DESCRIPTION OF THE INVENTION

Figure 6:
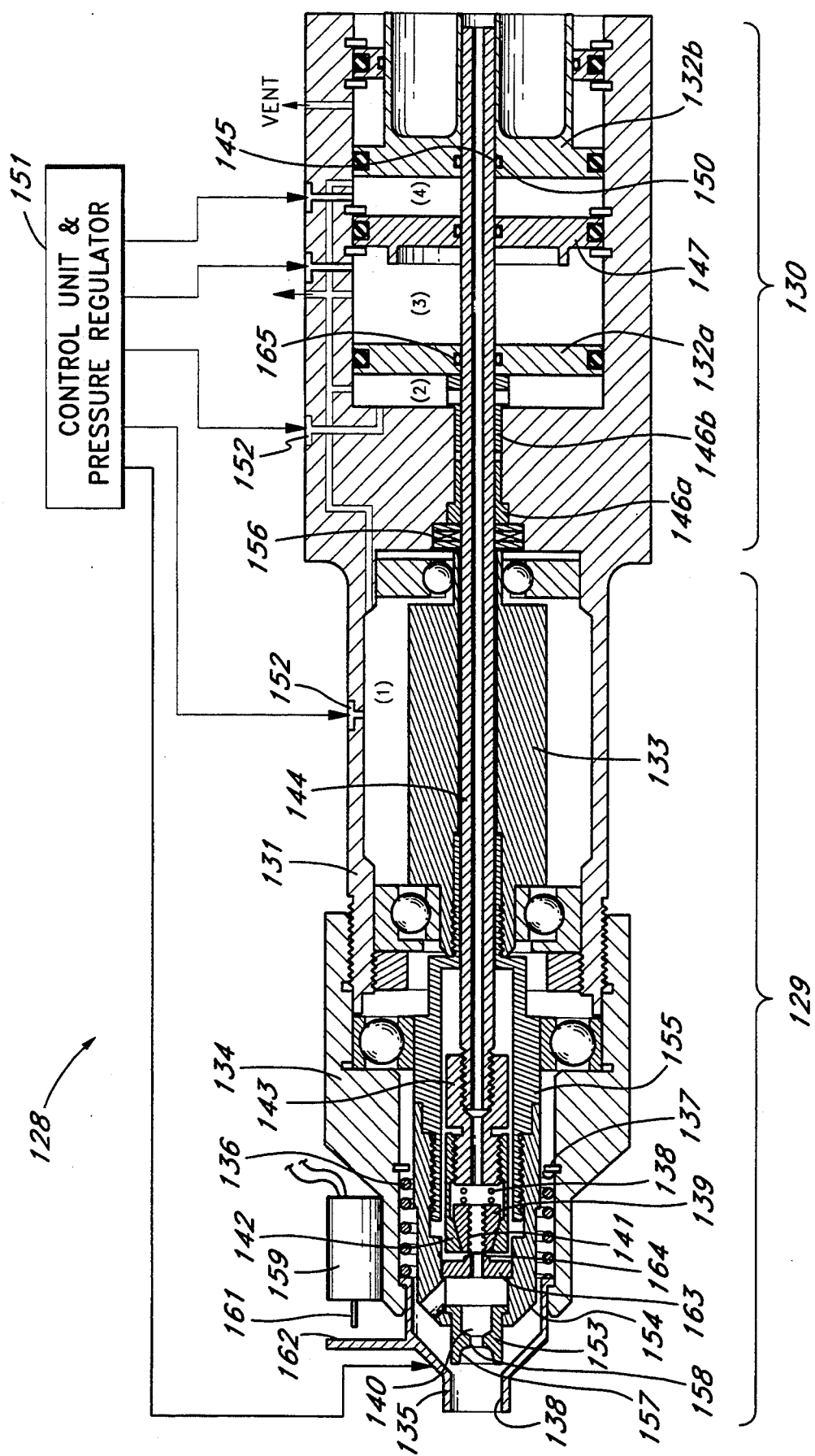
FIG. 6 is a sectional view of the hand held tool used to install the fasteners.

FIG. 1 shows an embodiment of the present invention comprising a solid composite fastener 10, positioned within a coaxial bore 28 of a workpiece 22 comprising two panels 24, 26, with a countersunk head 12 flush with the workpiece 24.

The solid composite fastener 10, which is shown in the upper half of FIG. 1 before processing commences, comprises a generally cylindrical elongated body of reinforced thermoplastic material having a preformed rivet head 12 at one end. The fastener further includes a cylindrical shank 14 having a tail 16, and a cylindrical rivet stem 18 extending from the tail 16. An annular break notch groove 20, with a reduced cross-sectional area, is provided between the end of the tail 16 and the beginning of the stem 18. Annular serrations 76 are also provided along the leading end of the stem.

FIG. 1 also shows some of the component parts of the hand-held tool 32 used to install the solid composite fastener 10 to the workpiece 22. A more complete discussion of all of the component parts of the hand-held tool 32 and 128 is provided later in this discussion. As can be seen in FIG. 1, the upper half of the drawing above the center axis 42 represents the positioning of the component parts of the hand-held tool 32 prior to fastening the composite fastener to the workpiece 22. The lower part of FIG. 1 under the central axis 42, represents the positioning of the component parts of the hand-held tool 32 after the shank 14 and tail 16 portion of the fastener 10 are upset to form a new flange 64.

As can be seen in FIG. 1, the hand-held tool 32 is placed over the fastener 10 with the stem 18 projecting through the forming die 44 and jaw opener 68, and into the pulling jaws 34 which are locked over annular serration 76 on the stem 18. The pulling jaws 34 are locked over the annular serrations 76 as the collet 38 slides concentrically over the outside of the jaws 34. The collet's tapered inside surface transmits an inward force component which forces the jaws 34 together as the collet 38 is pulled in the direction of the arrow 74. As the pulling jaws 34 pull on the stem 18, a counteracting force in the opposite direction is generated which causes the forming die 44 and its assembly to advance forward toward the workpiece 22 and in the direction of the arrow 48, as will be discussed more fully later. In addition, the pulling jaws 34 and collet 38 are non-rotating with respect to the stem and workpiece, and are concentric about axis 42.

As the forming die 44 advances forward toward the workpiece 22, as indicated by arrow 48, it rotates concentrically about axis 42. The powering mechanisms that rotate the die and pull the collet will be described more fully later. In this embodiment of the hand-held tool 32, the forming die has an inside diameter 50 slightly larger than the diameter of the stem 18 and an internal taper 52 at its forward end 54. The widest inside diameter 56 of the taper 52 is sufficiently larger than the diameter of the tail 16 to allow displacement of a portion 58 of the tail 16 to the forward-most position of the forming die, as shown by arrow 60 in the lower half of FIG. 1, as processing is completed. A shroud 40 is concentrically and slidably positioned at the forward end of the tool 32, and is pressed against the workpiece 22, and is also non-rotating with respect to the workpiece 22 and the fastener 10. Additional details of the hand-held tool 32, which can be adapted to various size fasteners by adjusting the internal diameter of the forming die 44 and pulling jaw 34 and collet 38 assembly, are provided later in this discussion with respect to FIGS. 6 and 7.

The solid rivet 10 is preferably made from a composite of a polymer matrix reinforced with long fibers. In this embodiment, the composite material can be initially formed with thin sheet-like tapes, called plies, containing fibers which add to the strength of the plies. A suitable tape has a thickness of about 0.005", but other thicknesses can be utilized. Each tape contains a plurality of individual carbon or other reinforcing fibers, which are twisted or otherwise held together in a bundle referred to as a tow. A commonly used fiber is about 7 microns in diameter. A commonly used tow contains 12,000 individual fibers. The tows are arranged parallel to each other and are bound together using a binding of polymeric resin. A common binder for binding the carbon fibers and tows together is PEEK, referred to above. The tows, with their large numbers of individual filaments, greatly increase the shear strength of the tape as well as the tension strength in the direction of the fiber flow axes. Since a composite material in theory could have individual fibers rather than bundles, tows are often referred to as fibers.

The tapes can be made into a panel by stacking a number of plies on top of one another. The stack is then heated while applying a compressive load. This process causes the binder and adjacent plies of tape to bind together and harden when cooled. This creates a rigid composite panel having the desirable characteristics discussed above.

To use the material to make a fastener, a square cross-section bar is cut from the edge of the panel. The bar can then be machined to produce the fastener 10, shown in the upper half of FIG. 1. The head 12 can be formed by machining or by heat and compression.

The fibers in all of the layers or plies of tape extend axially to produce what is termed a unidirectional, reinforced long fiber rivet. Other orientations may be useful, wherein a lay-up of tapes could be used with some plies positioned at an angle with respect to the fastener axis. The fibers can also be fragmented and interspersed for ease of deformation.

In an alternate embodiment of the invention, shown in the upper half of FIG. 2 before processing commences, a composite fastener assembly 80 is provided, comprising a tubular rivet 82 formed of reinforced thermoplastic material, with a rivet stem 88 made of a different material, concentrically located within the rivet and extending linearly from the head 84 and through the tail 86 of the rivet. In this embodiment, the rivet stem 88 is elongated and has a substantially uniform diameter which is smaller than the diameter of the rivet, and extends linearly through the rivet and outward from the tail 86 with annular serrations 90 along its leading end. The rivet head 84 is comprised of a conically-shaped thermoplastic material radially positioned on the outside, with a smaller metal head 94 concentrically located within, abutting the thermoplastic head 84 and connected to the stem 88. A break notch 92 is formed in the rivet stem 88 in close proximity to the end of the tail 86 between the rivet portion and the stem, to facilitate pulling of the stem free from the rivet.

Figure 7:
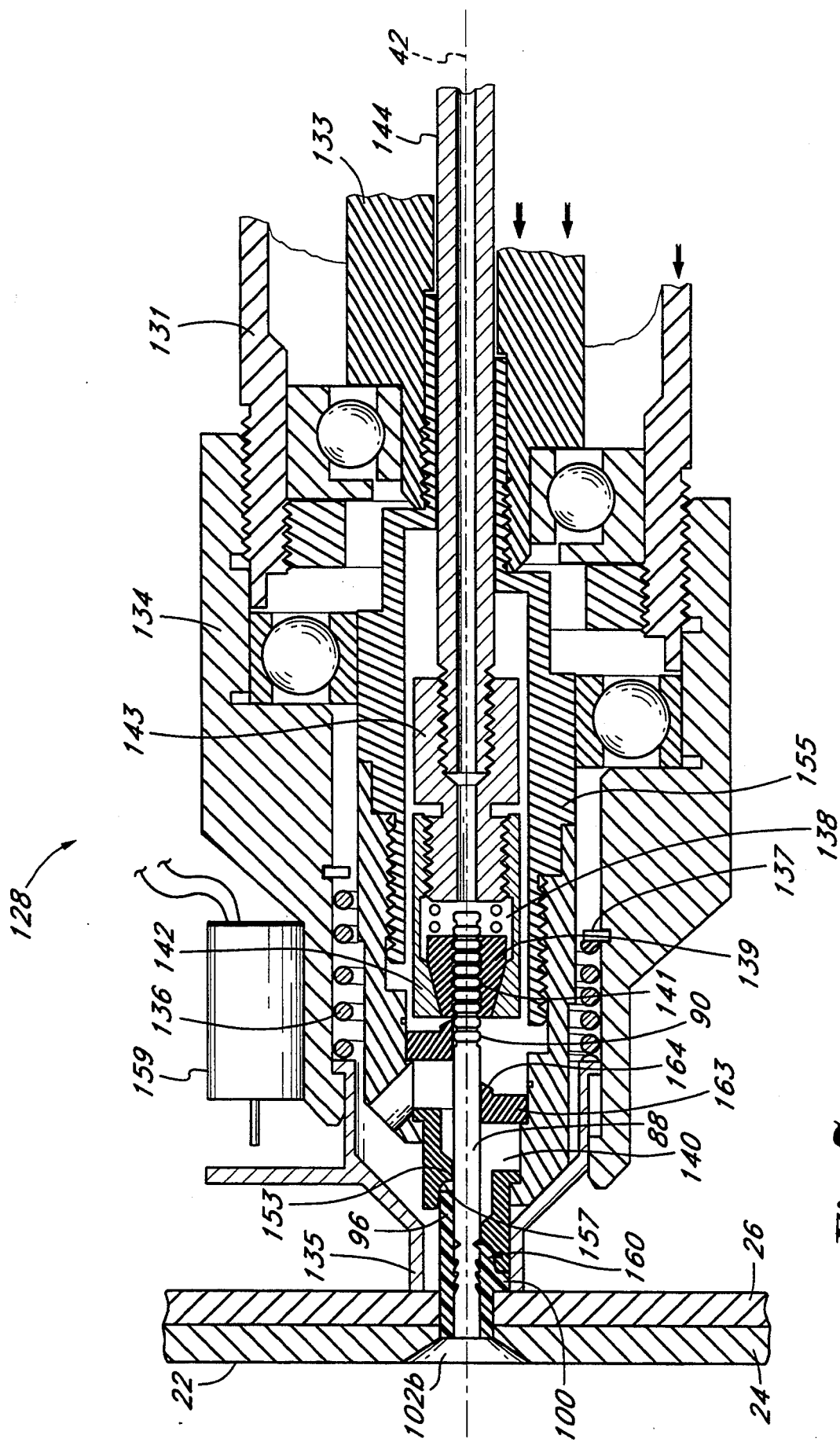
FIG. 7 is a sectional view of the front of the hand-held tool, the upper half showing the front portion of the tool before the rivet is set, and the lower half showing the position of the tool after the new head is formed by the tool.

The rivet stem 88 is made of materials such as metal having a higher tensile strength than the rivet composite material. Thus, the rivet stem can be smaller in diameter in this embodiment than the stem of the other embodiment. Even though the stem 18 of FIG. 1 has a greater cross-sectional area or diameter than the stem 88 of FIG. 2, they may have relatively the same tensile strength. The hand-held tool 32, shown in FIG. 1, may be adapted to the alternate fastener embodiment 80 of FIG. 2, having a smaller diameter rivet stem 88, as can be seen in FIGS. 6 and 7, and as discussed in more detail below. In the final assembly, a portion of the rivet stem remains within the tubular rivet 82, and is retained therein by an annular lock groove 95 spaced slightly from the break notch 92, and positioned within the tail of the rivet 82. The advantage of the arrangement of FIG. 2 over that of FIG. 1 is the need for less thermoplastic material which is more expensive than the required metal.

In other embodiments, as shown in FIGS. 3-4, the fastener of FIG. 2 is modified such that the entire head 102a and 102b is constructed of a metal material, and is attached to the rivet stem 880a and 880b, which is concentrically located in the thermoplastic rivet 820a and 820b. The metal head 102 can be conically shaped 102a, as shown in FIG. 3, or can be frusto-conically shaped 102b, as shown in FIG. 4, so that the tubular rivet 820a and 820b need not be formed with a head 84, as in FIG. 2. The main advantage of this is that comparatively less composite thermoplastic material is needed, and less machining and forming operations are required. Also, the tubular composite material can be extruded and head strength is also enhanced.

Annular lock grooves 104, positioned along the rivet stem 880a and 880b within the rivet 820a and 820b, may be utilized to provide additional retention and tension strength. The lock grooves 104 are advantageously shaped to secure the thermoplastic rivet body 820a and 820b to the metal stem 880a and 820b. Tensile strength is provided by the lock grooves 104 which give the rivet linear continuity from the head 102a and 102b through the stem 880a and 880b to the tubular rivet body 820a and 820b. The tubular rivet thermoplastic material may be preformed into the lock grooves 104 so that the tubular rivet 820a and 820b and stem 880a and 880b with the head 102a and 102b are interlocked in advance.

FIG. 5 shows another embodiment utilizing a head and stem being made of a material, such as metal, different from the thermoplastic tubular rivet portion. In this embodiment, a stem 880c is attached to a frusto-conical-shaped head 112, wherein a portion of the stem adjacent the head is configured to provide increased shear strength at the juncture nearest the workpieces. Several axially and radially directed flanges 118 protrude from the stem 880c adjacent the frusto-conical head 112. The flanges do not extend too far axially such that they interfere with the forming of the new head. A tubular rivet 116 configured to adapt internally to the flanges 118 on the stem 880c is provided. The tubular rivet 116 has an axial bore 120 through which the stem extends. Serrations 122 along the outer edges of the flanges 118 are provided to give additional retention and tension strength to the rivet. The tubular rivet portion 116 can be pre-molded so that the thermoplastic material fills the serrations 122, and binds the rivet stem body 880c with the tubular rivet 116 to prevent respective movement between the two pieces in a longitudinal direction. This embodiment also has a notched groove (not shown) on the stem to facilitate separation of the stem from the rivet body. The main advantage of this embodiment is that comparatively less thermoplastic material is needed, and the increased metal in the stem of the rivet increases shear strength.

To install the fasteners, the fastener is inserted through a hole 28 in the workpiece 22, consisting of two or more composite panels 24 and 26. A counter bore 30 can also be formed to receive the rivet head 12, 84,102a, 102b or 112 providing in this instance, a flush surface, as can be seen in FIGS. 1–4 and 7.

The hand-held tool 128, shown in FIGS. 6 and 7, which is used to install the fasteners, comprises an elongated body having a substantially cylindrical shape in the front portion 129, and a back portion 130. The outer body of the tool is comprised of a housing 131 containing the driving mechanism, i.e., pistons 132 and rotor 133, and a cylindrical outer housing 134 attached to the front of the main housing 131. A substantially cylindrical shroud 135 is slidably positioned in the tip of the outer housing 134. The shroud 135 is urged axially out of the housing by a coil spring 136 held in place by a retaining ring 137. Flanges on the shroud and the housing limit the outward movement of the shroud.

During operation, the tool 128 is centered over the stem 88 of a fastener positioned in the workpiece, with the stem 88 projecting into the circular opening 138 in the shroud 135 and extending axially into the tool. The tool 128, as shown in FIGS. 6 and 7, is adapted for use in installing the fasteners of FIGS. 2, 3, 4 and 5, which have a smaller diameter stem than the fastener of FIG. 1, and a rivet portion 96 extending further linearly outward. Any reference to the fastener in the discussion of tool 128 is intended to refer to any of the several embodiments already discussed, as well as any that may be suitable for use with the tool, as may be apparent to one skilled in the art. The concentric alignment along the center axis 42 of the cavity 140 ensures self-alignment of the rivet stem 88 as it is inserted into the tool.

As the tool 128 is placed onto the extending rivet stem 88, the shroud 135 is urged against the workpiece 22 and the coil spring 136 exerts pressure as the tool is pressed toward the workpiece. The pressure exerted by the coil spring 136 is preferably approximately 20 lbs. The stem 88 of the fastener also extends axially through a bore 158 in the forming die 153, and a bore in the jaw opener 163 and into the cavity 140, where pulling jaws 139 can grip the stem. The pulling jaws 139, which are located concentrically within the cavity 140 inside the outer housing 134 of the tool 128, is configured such that they exert a radially inward force on the stem, as known by those of ordinary skill in the art. The jaws 139 have inversely positioned annular serrations 141 on the inside surface that mate with the serrations 90 on the stem 88 of the rivet, so that the pulling jaws grip the stem. A substantially tubular ring member or collet 142 concentrically surrounding the pulling jaws 139, is provided to facilitate gripping and pulling of the jaws. When the collet 142 is pulled, its tapered inside surface aligns with and contacts the slanted outer periphery of the pulling jaws 139, and directs a radially inward force component which forces the pulling jaws radially inward about the annular serrations 90. As the collet 142 is pulled in a direction away from the rivet head 84, the pulling jaws 139 grip the stem 88 and exert a pulling force on the rivet stem 88.

The collet 142 is connected to a collet adaptor 143, which is connected to a draw bolt 144 extending axially within and throughout the center of the tool 128. It may be worth noting that each of the connected components can be constructed of hardened metal or formed, molded, cast, or rolled steel or alloy, and are attached by means known in the art, such as by thread, as shown. The draw bolt 144 has several spaced annular grooves 145 which are connected to a driving mechanism, i.e., pistons 132, which translate a pulling force to the draw bolt. Front and rear bushings 146a,b, respectively, are also concentrically located around the draw bolt 144 within the housing 131 to allow free movement of the draw bolt with respect to the housing. It is worth noting that the pulling jaws 139, collet 142, collet adaptor 143 and draw bolt 144 are all non-rotating with respect to the stem 88 and workpiece 22 and are concentrically located about the axis of the tool 128.

The driving mechanism illustrated comprises two separate pneumatically operated pistons 132a,b positioned at the back end of the tool 130 within the housing 131. Two pistons are disclosed for illustrative purposes only, but the tool 128 may comprise any number of pistons as required. In the preferred embodiment, one piston 132a is located in front of the other 132b with a common air chamber divider 147 between the two pistons. Air chambers (2), (3) and (4) are positioned adjacent the pistons 132a,b. An air chamber cap 148 and a vent 149 are located behind the second piston. Both pistons 132 and their respective chambers are concentrically located about the draw bolt 144. Rings 150 transmit axial forces between the draw bolt 144 and pistons 132 via annular grooves 145 and annular grooves 165 in the inner diameter of the pistons. Again, any configuration of concentrically located pistons are feasible; the above arrangement is provided only as an example of one possible arrangement.

To exert a pulling force on the draw bolt 144, pressure is pneumatically applied into the piston air chambers, either (2) or (4) or both, exerting a force against the pistons 132a,b which move in a direction away from the workpiece 22. A separate pneumatic regulator 151 with a timer is provided with different settings and connections so that varying pressures can be supplied for varying lengths of time to the different chambers. Various vents 152 are also provided to allow air pressure to be vented out of the chambers. For example, chamber (3) is vented when chamber (2) is pressurized, and the rear vent is opened when chamber (4) is pressurized. The respective arrangement of the pistons, chambers and vents for achieving the required directional forces should be readily known to those skilled in the art.

The pulling force advantageously exerts a force on the draw bolt 144 which translates through the collet adaptor 143 and collet 142, and through the pulling jaws 139 to pull the stem of the rivet. The pulling force exerted on the draw bolt 144 causes a reaction force in the opposite direction which causes the forming die 153 assembly to advance forward onto the rivet tail 86. To better understand the operation of the tool, one might consider that if the tool were operated without having the pulling jaws 139 gripping the stem, the tool would remain stationary and the pulling jaws 139 and draw bolt 144 would merely be pulled further into the tool. However, because the jaws 139 grip the stem, which remains substantially stationary with respect to the workpiece, the pulling force causes the tool to move forward in the opposite direction, which advances the tool toward the workpiece. Because the forming die 153 mounted in the tool quickly engages the tail 86 of the rivet, the pulling force on the stem is quickly counteracted and equalized by the forward force on the rivet. The pulling and forward forces are displaced into the rivet and stem, and are substantially balanced. Therefore, pressure on the workpiece is minimized, and an anvil on the other side of the fastener is not needed.

The forming die 153, concentrically located within the tool 128 immediately inside the shroud 135 and outer housing portion 134, is positioned so that it will make contact with the rivet tail 86. The forming die 153 is attached to tubular holder 154, which is threadably connected to a coupling 155, threadably connected to the turbine 133. This assembly concentrically positioned between the draw bolt 144 assembly and the outer housing 134 is allowed to freely rotate on suitable bearings.

As a pulling force is applied to the draw bolt 144, pressurized air is also supplied to chamber (1) to rotate the turbine 133. Because the forming die 153 is connected to the rotor 133, the rotation of the rotor translates directly to the forming die 153, causing it to spin as well. A thrust bearing 156 at the rear of the rotor 133, in combination with the pulling force on the rivet stem 88, transfers a counteracting pushing force which moves the tool 128, as well as the rotor and forming die assembly, in a forward direction.

The forming die 153 within the shroud 135 rotates concentrically about the tool's axis 42 and advances toward the rivet tail 86 and workpiece 22. The forming die 153, in the embodiment shown in FIGS. 6 and 7, has an internal cavity 157 having a frusto-conical shape, the leading edge of which engages with the tail 86 of the rivet to form the new head 160. The forming die 153 also has a hollow bore 158 axially within the center through which the stem 88 of the rivet extends to be gripped by the pulling jaws 139. The inside diameter of the bore 158 is preferably only slightly larger than the diameter of the stem 88 to minimize flash, while avoiding friction with the stem as the die 153 spins.

The tool 32 used to fasten the solid rivet fastener 10, as partially shown in FIG. 1, has a slightly larger diameter shaft 50, with an internal taper 52 at its forward end, so as to facilitate entry of the larger stem 18 into the shaft 50. In this embodiment, the leading portion of the forming die 44 has an inside taper 52 which is slightly larger than the diameter of the shaft 50, but which is also slightly smaller than the diameter of the rivet shank 14 and tail 16. The forming die 44 in this embodiment is more like a sleeve, as shown in FIG. 1, which frictionally pushes the shoulder 58 portion of the rivet 10 toward the workpiece to form the flange 64.

Figure 10:
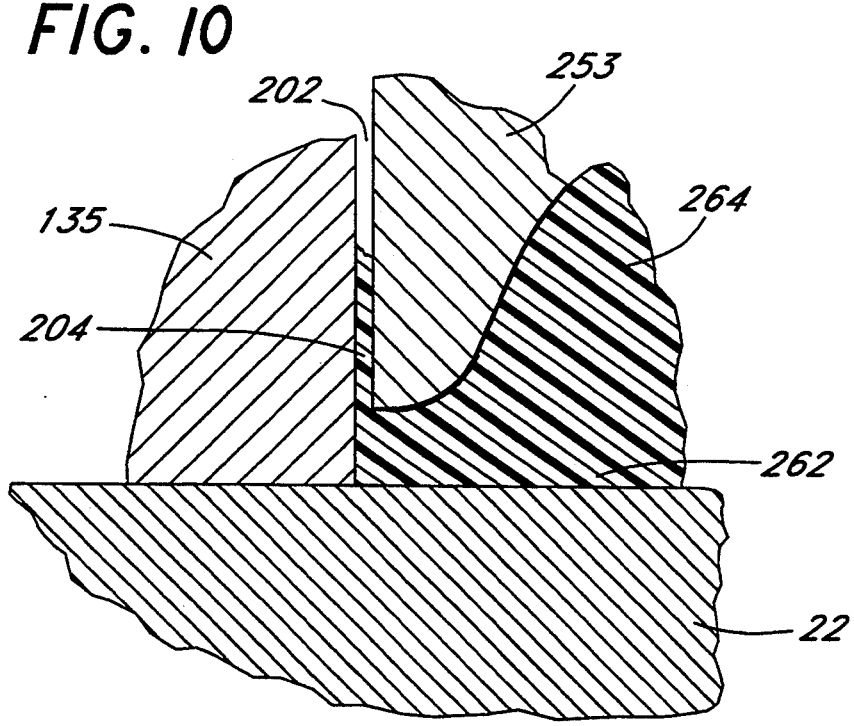
FIG. 10 is an enlarged portion of the upset head of FIG. 9 illustrating the flash gap of the tool of the invention and illustrating flash from the upset head.

In either embodiment of the tool, 32 or 128, the forming die 44, 153 and the tool body 134 move toward the workpiece in a forward direction as the pulling force is applied and the forming die rotates. The leading edge of the die then contacts the tail portion 16, 86 of the rivet, causing friction which generates heat. For simplicity, the remainder of the discussion will refer to tool 128, and the fastener of FIG. 4, but the concepts discussed are equally applicable to tool 32 and fastener 10, and the other fasteners discussed above. The forming die 153 also spins and moves concentrically within the inside diameter of the shroud 135, which remains stationary, adjacent the workpiece 22. The outside diameter of the die 153 is slightly smaller than the inside diameter of the shroud 135. A gap, however, is selected to permit excess softened tail material to be extruded out of the flange area between the die and the shroud. Preferably, the clearance or flash gap is about 0.005 inch all the way around the circumference of the die. In other words, the diameter of the die is about 0.010 inch less than the internal diameter of the shroud. Such an arrangement is illustrated in FIG. 10, wherein a flash gap 202 is shown between a die 253 and the shroud 135. Flash 204 is shown extruded into the gap 202. The die shown is for a fastener 200 not having a pull stem.

While there is some flash between the stem and the die with the pull stem fastener, this is relatively insignificant because the clearance is small and the area of any clearance is so much less than that adjacent the shroud, in view of the circumferential difference. The fastener stem should closely fit through the die as enabled with the die of FIG. 6, rather than a loose fit as schematically illustrated in FIG. 1. Thus, the controlled flash provides a means of grip compensation for workpieces of different thicknesses and for fasteners of varying lengths.

Due to the heat generated by friction between the die 153 and rivet tail 86, and the pressure exerted by the advancing forming die 153, the tail 86 softens and deforms. The advancing leading edge of the forming die then rubs and frictionally advances the softened thermoplastic material 96, swirling the fibers therein toward the workpiece 22 and radially outward in the space between the die 153 and shroud 135. The upper half of FIG. 7 shows the position of the forming die 153 prior to operating the tool, while the bottom half shows the position of the forming die after the deformation process has been completed.

The leading edge of the forming die 153 continues to move forward until its rotation is stopped by a sensor 159, which in one embodiment senses the thickness of the newly created flange 100. Once the rotation stops, the forming die 153 continues to advance towards the workpiece and the pressure is still exerted onto the rivet tail 86, and the pressure in some cases is increased. The softened material hardens relatively quickly in the shape of the upset head 160 within the cavity 157 of the die 153. The flange is formed while the die is spinning in the space between the leading edge of the forming die 153, the inside diameter of the shroud 135, and the surface of the workpiece 22, and is tightly pressed against the workpiece. Consequently, softened tail material can still be squeezed through the flash gap. To allow for this, the die rotation is stopped a preselected amount of flange thickness before the desired hardened flange thickness is attained. Preferably, this amount is about 0.015 inch.

The temperature of the thermoplastic material drops from the approximately 600° F. needed to soften the material to approximately 400° F. after the forming die 153 stops rotating. Cooling is facilitated by the application of air in the cavity around the die, which can be supplied pneumatically by the control regulator 151, or by other means. This is schematically illustrated in FIG. 6. Conveniently, the air for the now deenergized turbine can be redirected to the die for cooling purposes. The pulling force on the draw bolt 144 continues after the forming die 153 stops rotating for preferably approximately 10 seconds as the rivet cools, the timing of which is controlled by an automatic timer in the pneumatic control regulator. The actual time can be more or less, depending on the desired hardness and/or the extent the material is softened. The upset head 160 then cools and hardens in the shape of the forming die 153, and the newly formed flange 100 forms and hardens between the leading edge of the die 153, the shroud 135 and the workpiece 22.

The reason for possibly increasing pressure, when the upset head is hardening is to provide appreciable residual compression load on the workpiece, even after the tool is disengaged. This is desirable for acceptable fatigue life.

The present invention also allows the rivet to be fastened onto varying workpiece 22 thicknesses without affecting the size of the upset head 160 or flange 100. Varying the workpiece thickness only affects how far the rivet stem 88 extends outward from the workpiece 22, and how much thermoplastic material must be deformed on the tail 86. As long as enough thermoplastic material 96 extends outward from the workpiece on the tail, an upset head and flange can be created. As noted above, any excess thermoplastic material, or flash is squeezed or extruded out of the forming die.

The sensor 159 can be operated in at least three different embodiments. First, the sensor 159 can have a feeler 161 adjustably set to the desired flange 100 thickness at the tip of the tool so that when the feeler makes contact with a plate 162 mounted on the shroud 135, the advancing forming die 153 stops spinning. Secondly, the sensor 159 can be comprised of a pressure gauge (not shown) in the shroud 135 which senses an increased force exerted by the forming die 153 on the rivet tail 86 when the flange cavity is filled. Thirdly, the sensor 159 can be comprised of a pressure gauge (not shown) which senses the increased pulling force exerted by the pistons 132 when the cavity is filled.

Once the new head 160 has been formed and hardened, the control regulator, after an adjustable period of say about 10 seconds, automatically increases the pneumatic pressure to generate an increased pulling force. As this pressure increases, the tensile strength of the break notch 92 is exceeded and the stem 88 or a portion thereof separates from the tail 86 fracturing at the notch. This increased pulling pressure on the draw bolt 144 is also counteracted and transferred simultaneously through the body of the tool and into the rivet. Thus, the increased pulling pressure needed to fracture the stem does not generate a comparable pushing force component in the opposite direction against the workpiece 22. Of course, the modest amount of pressure from the coil spring 136 continues to be exerted by the shroud 135 against the workpiece.

After the rivet stem 88 is fractured, the rivet stem can be automatically removed from the tool 128 by pneumatically pressurizing chamber (3), which drives the first piston 132a in a forward direction and exerts a forward pressure on the draw bolt 144. This forward pressure translates a force onto the collet 142 and pulling jaw 139 mechanism, which in turn drives the pulling jaws against a jaw opener 163. The jaw opener 163 has a collar 164 which slides inside the collet 142 and forces the pulling jaws 139 away from the collet. As the pulling jaws 139 are separated from the collet 142, the jaws are opened as they slip over the tapered edges of the serrations 90 on the stem 88. The stem 88 is then ejected free of the jaws 139 and can be removed from the interior cavity 140 of the tool 128. The jaws 139 then move forward against the collet 142 by light spring pressure from spring 138 and the tool 128 is now ready to receive a new rivet stem 88.

Figure 8:
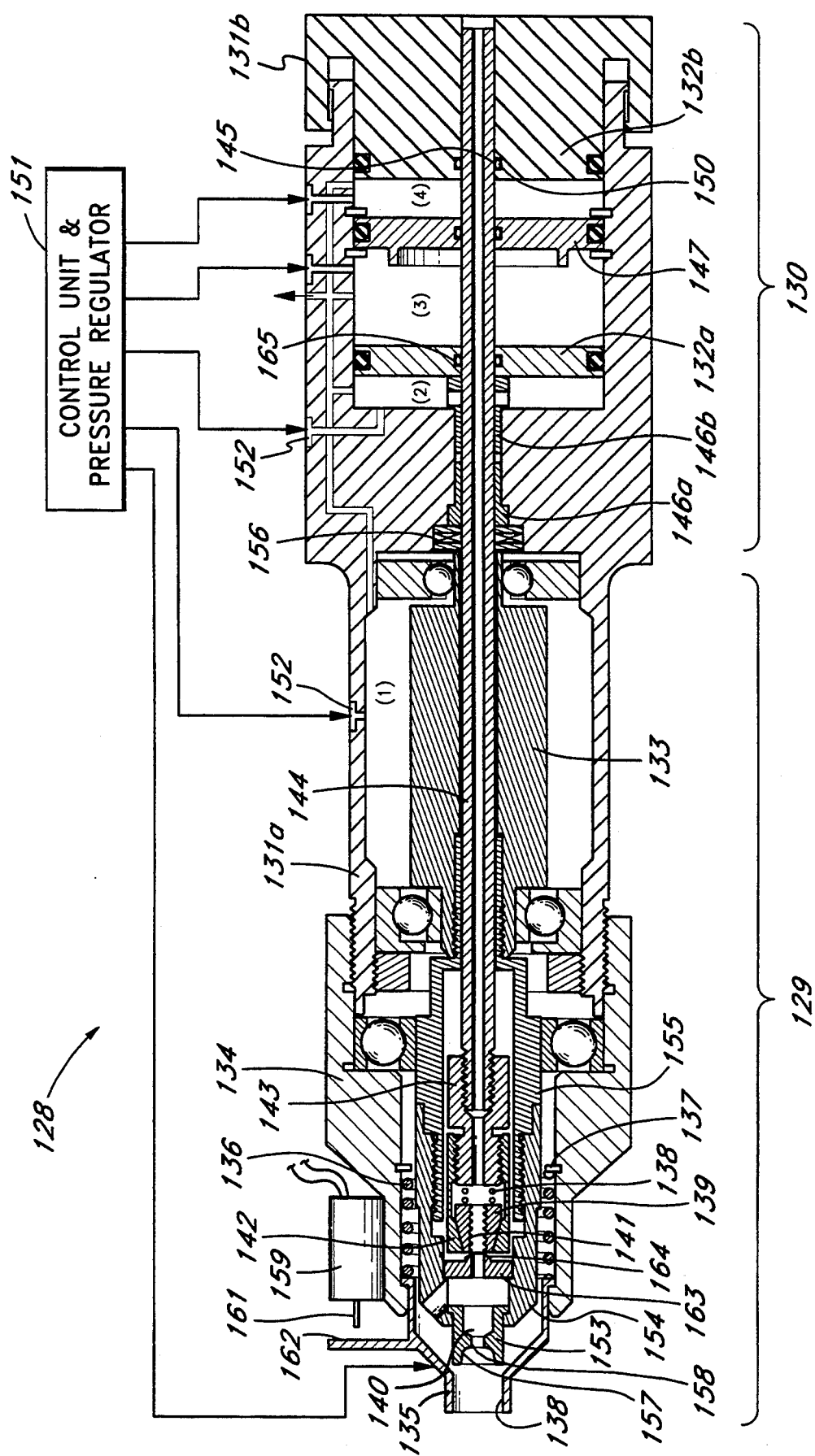
FIG. 8 is a modified form of the tool of FIG. 6 with which initial pressure is applied to the forming die and the counteracting pulling force is applied to the jaws.

While it is preferable that the jaws of the tool be retracted in the tool housing by having a pulling force applied against a piston attached to the draw bar, which results in a reacting pressing force on the rotating die, it should be recognized that the initiating and reacting forces can be reversed. That is, the rotating die and the forward portion of the tool housing can be moved forward relative to the draw bar and a rear housing portion. Thus, once the fastener stem is gripped by the jaws, a pressing force may be applied by a rotating die against the fastener causing a counteracting pulling force on the stem. Such an arrangement is shown conceptually in FIG. 8 wherein the forward portion 131a of the generally cylindrical housing is shown separate from a rear portion 131b which is fixed to the draw bar 144. This rear housing portion 131b can be connected to a suitable hand grip or other support (not shown).

If the stem of a fastener is inserted into the jaws of the tool, the jaws will part slightly to permit entry of the stem, and the stem will be gripped by virtue of spring 138. If the tool is then operated without a fastener being restrained, such as in a fixed workpiece, application of pneumatic pressure to chambers (2) and/or (4) moves the forward housing portion 138 carrying the turbine 133 and the die 153 forwardly with respect to the rear housing portion 131b and the draw bar 144. In other words, the pistons 132a and 132b are essentially stationary while the surrounding chamber walls move. As the die engages the fastener, a counteracting pulling force is applied to the stem by means of the jaws and draw bar as in the embodiment of FIG. 7. With pressurized air applied to the turbine 133 as the die is pressed forwardly, the deformation of the fastener proceeds as in the embodiment of FIG. 7. After the fastener is deformed and the pulling force on the stem increased to break the tail away, venting the pressure from chambers 2 and 4 and applying pressure to the chamber 3 retracts the die 153 together with the jaw opener 163.

Figure 9:
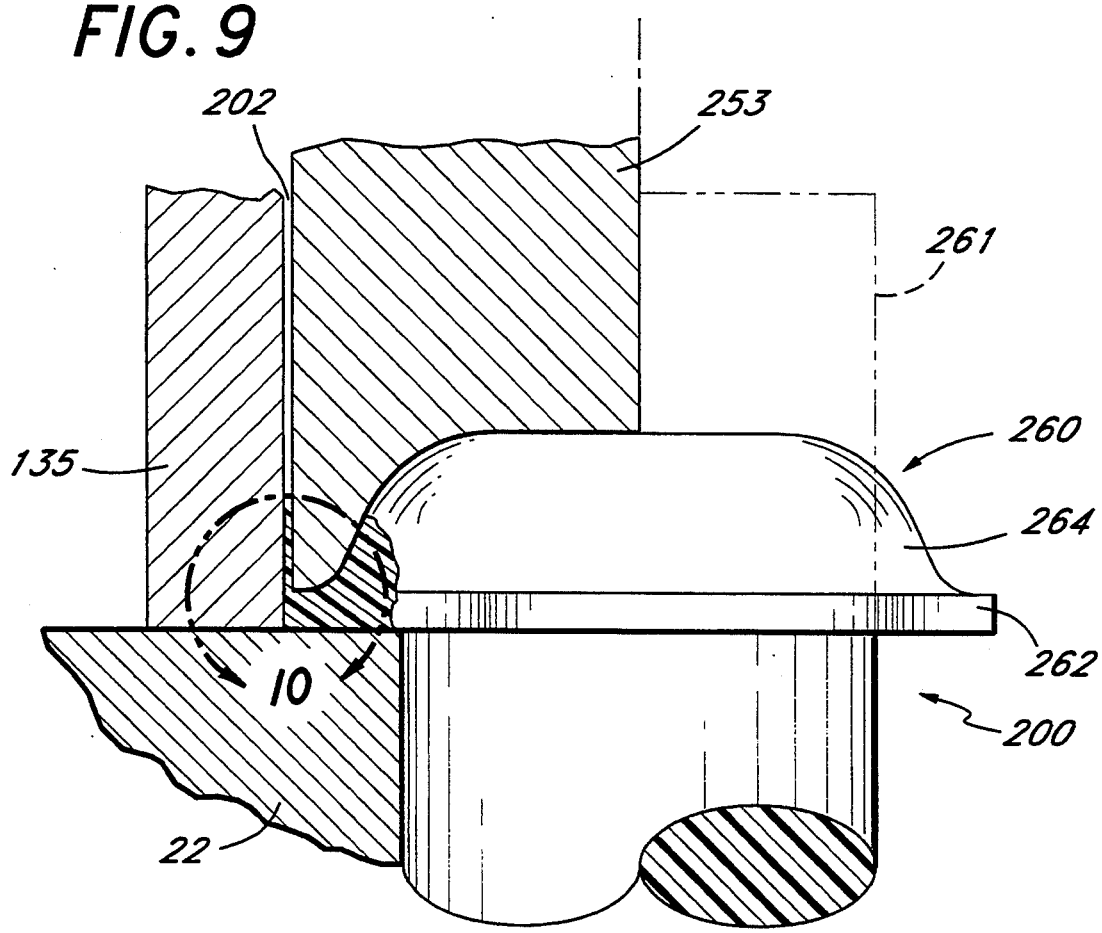
FIG. 9 is a cross-sectional view illustrating a preferred profile of an upset fastener head of the invention.

In developing the fasteners disclosed herein and that disclosed in parent application 07/682,880, which is incorporated herein by reference, it was thought that the portion of the fastener tail protruding from the workpiece should be about three times the diameter of the fastener shank and the height of the upset head should be about 1½ times the diameter of the shank. However it has since been learned that desirable results are obtained when utilizing much less material. The fastener tail 261, need only initially protrude beyond the workpiece 88 of the diameter of the shank, or roughly about the same as the shank diameter as shown on the right side of FIG. 9 in phantom lines. Greater protrusion is acceptable in view of the grip compensation provided by the flash gap 202 referred to above, but much more than the shank diameter is wasteful. The upset head 260 of FIG. 9 illustrates what is now believed to have the preferred profile. The head 260 still has a frustoconically shaped central portion 264, but its height above the flange 262 is only about ½ the shank diameter, when it used to be about one diameter. The flange 262 is preferably in the range of 0.015 to 0.025 inches thick, most preferably about 0.020. The small diameter end of the central portion 264 is preferably about equal to the diameter of the shank, with the larger end being about 1.3 times the shank diameter. This creates a taper from the large end to the small end of about 25 degrees. The flange 262 diameter is preferably 1.5 times the shank diameter.

The upset head 260 shown in FIG. 9 is a solid fastener type not employing a pull stem. Such a fastener with a different head profile is shown in parent applications 07/475,155 and 07/682,880, referred to above. The same profile is also desirable by the pull type fasteners of FIGS. 1-4.

In one example of fabricating a rivet of the non-pull stem type having a quarter inch nominal diameter shank, a five hundred pound tool end load was applied to the fastener tail up to and after fastener cooling. This resulted in appreciable residual compression load in the workpiece even after the tool was disengaged. The tool was rotated at about 2700 revolutions per minute. This produced an optimum static tension load on the installed fastener of about 30 KSI. The fastener employed utilizes elongated carbon fibers held by a PEEK binder. Materials such as PEEK with glass fibers would require different parameters.

In another prototype of the pull stem type, a 3/16th nominal shank diameter employing a pull stem, the forming die was rotated at about 13,500 RPMS, when the forming die was applied to the fastener tail; however, under load, speed was reduced considerably. Optimum tension values on the installed fastener shank were obtained with a 120 pound end load on the forming die during upsetting of the tail, and 300 pounds end load after rotation was stopped while the rivet cooled. This has produced fasteners having an average tension load of 22 KSI.

From the foregoing, it can be recognized that there are many variables to be considered in determining the desired or optimum conditions for forming the upset head. These include the rivet shank protrusion beyond the workpiece before upsetting, the rotational speed of the forming die, the anvil or forming die end pressure on the rivet tail and the upset head, the flash gap surrounding the die, the timing after the spindle rotation stop, and the upset head profile. Because of this, precise numbers cannot be given, but there are some generalized relationships that can be stated.

The rotating die requires a certain rotational speed and pressure on the upset head in order to soften or melt the particular thermo plastic material. Increasing rotational speed reduces pressure needs, likewise increased pressure, reduces speed needs. In addition, a desired pressure is needed during the hardening stage of the upset head in order to have adequate residual compression load in the workpiece after the tool is disengaged. This in turn is influenced by the size of the flash gap. Reducing the cross-sectional area of the flash gap increases the pressure on the upset head, but decreasing the gap increases the time required to form the upset head, particularly in a minimum grip situation where there is considerable flash to be extruded. Speed of operation is of course also important. Further, the speed is greatly affected by the pressure and rotational speed of the forming die. Installation time for a fastener in the range of 5 to 10 seconds is quite satisfactory, and as noted above, a flash gap of about 0.005 inch has been found to be acceptable. With those parameters for a 3/16 diameter inch pull stem type fastener employing carbon fibers with a PEEK binder, rotational speeds of 5,000 to 15,000 revolutions per minute with die end pressures in the range of 100 to 300 pounds are believed to be satisfactory. This is not intended to mean that selecting the lowest of the speed range and the lowest of the pressure range would be satisfactory. Instead, those parameters should be varied in the ranges indicated to obtain an acceptable installation time.

It should also be noted that the pressure applied to the stem is of course limited by the pressure required to break away the stem after the upset head has solidified. The fastener not employing a pull stem does not have that limitation.

Although this invention has been described in terms of certain preferred embodiments, other embodiments that are apparent to those of ordinary skill in the art are also within the scope of the invention. Accordingly, the scope of the invention is intended to be defined only by reference to the appended claims.

What is claimed is:

1. A composite fastener, comprising:
   a tubular body having a shank and a tail of thermoplastic material, said tail being made deformable by a rotating die pressed against the tail;
   a stem extending axially through said body, having a head at one end abutting and extending radially beyond one end of said shank, and a pulling end extending beyond said tail, said stem being made of a different material than said body.

2. The fastener of claim 1, in which said stem, including said head, is made of metal, and said thermoplastic material is fiber reinforced.

3. The fastener of claim 2, in which said stem has a lock groove for receiving a deformed portion of said material when said rivet tail is deformed by heat and pressure into an upset head.

4. The fastener of claim 2, wherein said stem includes portions extending into said shank to axially lock the stem and body together, said portions being formed before the fastener is installed in a workpiece.

5. The fastener of claim 4, including a plurality of ribs integral with said stem which extend into said shank, said ribs having serrations located on the outer portions of said ribs to lock said shank to said stem.

6. An assembly, comprising:
   a workpiece including first and second sides;
   a fastener having an elongated shank extending through said workpiece;
   a preformed head adjacent to one end of said shank on the first side of said workpiece;
   an upset head on an opposite end of said shank, and pressed against the second side of said workpiece to prevent the shank from being withdrawn from said workpiece, said upset head including a plurality of fibers held together by a plastic binder, said upset head having been formed by pressing a rotating forming die against a tail of said fastener, said tail including said fibers and said binder, to heat said binder by friction to cause the binder to melt or soften and deform together with adjacent ends of the fibers, with the deformed fibers being spun outwardly about the axis of rotation of the die and axially against the other side of said workpiece; wherein said shank is tubular, said fastener includes a stem which extends through said shank and said upset head, said preformed head is attached to said stem, and said preformed head engages one end of said shank and extends radially beyond said shank so that said preformed head engages the first side of said workpiece.

* * * * *